US012552151B2

(12) United States Patent
Yoon

(10) Patent No.: US 12,552,151 B2
(45) Date of Patent: Feb. 17, 2026

(54) SUBSTRATE PROCESSING APPARATUS AND METHOD

(71) Applicant: SEMES CO., LTD., Chungcheongnam-do (KR)

(72) Inventor: Kug Jin Yoon, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 72 days.

(21) Appl. No.: 18/387,539

(22) Filed: Nov. 7, 2023

(65) Prior Publication Data

US 2024/0149582 A1 May 9, 2024

(30) Foreign Application Priority Data

Nov. 7, 2022 (KR) ........................ 10-2022-0147179

(51) Int. Cl.
*B41J 2/045* (2006.01)
*B41J 2/165* (2006.01)

(52) U.S. Cl.
CPC ......... *B41J 2/0451* (2013.01); *B41J 2/04576* (2013.01); *B41J 2/04581* (2013.01); *B41J 2/16579* (2013.01)

(58) Field of Classification Search
CPC ..... B41J 2/0451; B41J 2/16579; B41J 2/2142
See application file for complete search history.

(56) References Cited

U.S. PATENT DOCUMENTS 11,779,946 B2 * 10/2023 Chen ...................... B41J 2/2142 347/14
2007/0222809 A1 * 9/2007 Ooshiro ................. B41J 29/393 347/19

FOREIGN PATENT DOCUMENTS

| | | | | |
|---|---|---|---|---|
| JP | 2003-251243 | | 9/2003 | |
| KR | 10-2008-0060066 | | 7/2008 | |
| KR | 10-2010-0007742 | | 1/2010 | |
| KR | 10-2018-0021647 | | 3/2018 | |
| KR | 102256058 | B1 * | 5/2021 | ....... H01L 21/02288 |
| KR | 10-2021-0078840 | | 6/2021 | |
| KR | 10-2021-0143663 | | 11/2021 | |

(Continued)

OTHER PUBLICATIONS

Office Action dated Feb. 25, 2025 for Korean Patent Application No. 10-2022-0147179 and its English translation from Global Dossier.

(Continued)

*Primary Examiner* — Sharon Polk
(74) *Attorney, Agent, or Firm* — WOMBLE BOND DICKINSON (US) LLP

(57) ABSTRACT

A substrate processing apparatus and method capable of responding to jetting abnormalities in real time are provided. The substrate processing apparatus includes: a first stage supporting a substrate; an inkjet head unit ejecting a substrate processing liquid onto the substrate as droplets; a gantry unit moving the inkjet head unit on the first stage; a droplet inspection unit inspecting the droplets; and a control unit performing compensation on the substrate based on results of the inspection of the droplets, wherein the inkjet head unit ejects the substrate processing liquid onto a usage area and a non-usage area of the substrate, and the droplet inspection unit inspects the droplets ejected onto the non-usage area.

20 Claims, 12 Drawing Sheets

(56) References Cited

FOREIGN PATENT DOCUMENTS

| | | | | | |
|---|---|---|---|---|---|
| KR | 10-2022-0005722 | | | 1/2022 | |
| KR | 20230098987 | A | * | 7/2023 | ........... G02F 1/1303 |
| KR | 20230100562 | A | * | 7/2023 | ........... G06T 1/0007 |

OTHER PUBLICATIONS

Office Action dated Jun. 10, 2024 for Korean Patent Application No. 10-2022-0147179 and its English translation provided by the Applicant's foreign counsel.

Notice of Allowance dated Sep. 5, 2025 for Korean Patent Application No. 10-2022-0147179 and its English translation from Global Dossier.

* cited by examiner

SUBSTRATE PROCESSING APPARATUS AND METHOD

CROSS-REFERENCE TO RELATED APPLICATION

This application claims priority from Korean Patent Application No. 10-2022-0147179 filed on Nov. 7, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a substrate processing apparatus and method, and more particularly, to a substrate processing apparatus and method, which can be utilized in the manufacture of a display device.

2. Description of the Related Art

When manufacturing a display device such as a liquid crystal display (LCD) panel, a light-emitting diode (LED) panel, or an organic electroluminescent (EL) component, printing processes can be performed on a transparent substrate using inkjet equipment. This inkjet equipment employs inkjet heads to jet fine ink droplets onto the transparent substrate, enabling patterning (e.g., RGB patterning) at desired locations.

Inkjet heads can be used for precision coating processes like color filters, organic LED (OLED) RGB, and OLED thin-film encapsulation (TFE). For this purpose, inkjet heads need to be capable of jetting ink droplets accurately in each desired direction. Therefore, regular inspection of inkjet heads is necessary.

However, conventionally, inkjet heads are inspected with separate modules (e.g., a jetting-on-film (JOF) module), leading to the challenge of not being able to address jetting abnormalities immediately during substrate printing processes.

SUMMARY

Aspects of the present disclosure provide a substrate processing apparatus and method, which can respond to jetting abnormalities in real time.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a substrate processing apparatus includes: a first stage supporting a substrate; an inkjet head unit ejecting a substrate processing liquid onto the substrate as droplets; a gantry unit moving the inkjet head unit on the first stage; a droplet inspection unit inspecting the droplets; and a control unit performing compensation on the substrate based on results of the inspection of the droplets, wherein the inkjet head unit ejects the substrate processing liquid onto a usage area and a non-usage area of the substrate, and the droplet inspection unit inspects the droplets ejected onto the non-usage area.

According to an aspect of the present disclosure, a substrate processing apparatus includes: a first stage supporting a substrate; an inkjet head unit ejecting a substrate processing liquid onto the substrate as droplets; a gantry unit moving the inkjet head unit on the first stage; a droplet inspection unit inspecting the droplets; and a control unit performing compensation on the substrate based on results of the inspection of the droplets, wherein the inkjet head unit ejects the substrate processing liquid onto a usage area and a non-usage area of the substrate, the droplet inspection unit inspects the droplets ejected onto the non-usage area, the droplet inspection unit inspects the droplets in units of swaths, the swaths are associated with a number of times pixel printing has been performed on an entire surface of the substrate, the droplet inspection unit inspects the droplets for nozzles that have been used to process the substrate, among a plurality of nozzles within the inkjet head unit, and the control unit performs compensation on the substrate by replacing defective nozzles with replacement nozzles.

According to an aspect of the present disclosure, a substrate processing method includes: ejecting a substrate processing liquid onto a usage area and a non-usage area of a substrate; inspecting droplets ejected onto the non-usage area; and performing compensation on the substrate based on results of the inspection of the droplets, wherein the performing compensation comprises performing compensation on the substrate depending on whether there are any defective nozzles among nozzles used to process the substrate.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
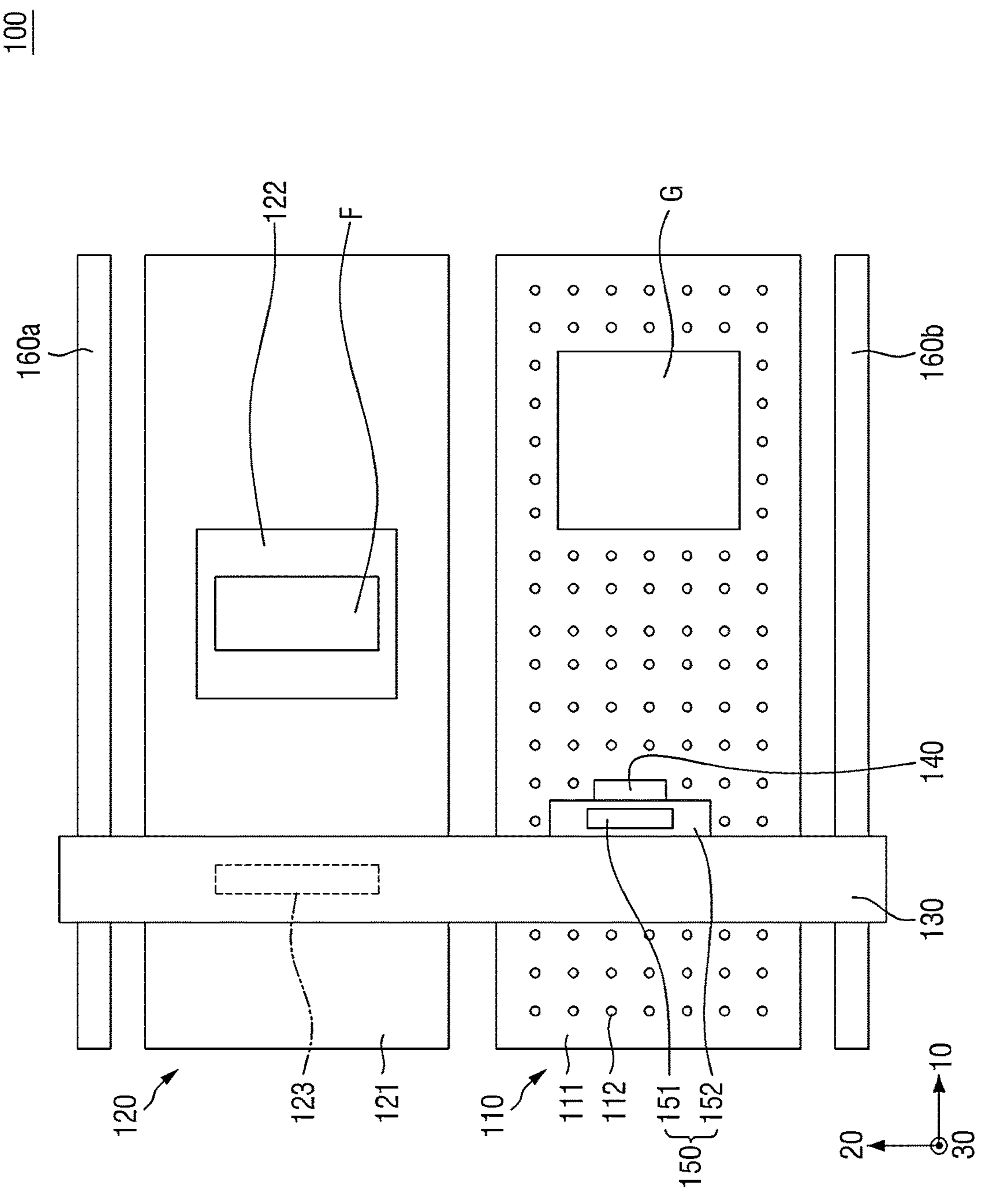
FIG. 1 is a plan view illustrating the internal configuration of a substrate processing apparatus using an inkjet technology.

Embodiments of the present disclosure will be described with reference to the attached drawings. The same reference numerals are used for the same components in the drawings, and redundant descriptions for these components will be omitted.

The present disclosure relates to a substrate processing apparatus and method, which can respond to jetting abnormalities in real time. The substrate processing apparatus and method allow for the inspection of an inkjet head unit during substrate processing, thereby minimizing waste of substrates, ink, and the like, and enhancing process efficiency. The following detailed description of the invention of the present disclosure will be provided with reference to drawings.

FIG. 1 is a schematic plan view illustrating the internal configuration of a substrate processing apparatus using an inkjet technology. Referring to FIG. 1, a substrate processing apparatus 100 may include a processing unit 110, a maintenance unit 120, a gantry unit 130, an inkjet head unit 140, and a substrate processing liquid supply unit 150.

The substrate processing apparatus 100 may process a substrate G, which is used in the manufacture of a display device. The substrate processing apparatus 100 may be provided as inkjet printing equipment that performs a printing process on the substrate G by jetting substrate processing liquid onto the substrate G using the inkjet head unit 140. The substrate G may be, for example, transparent glass.

The substrate processing liquid refers to a solution used for performing a printing process on the substrate G. The substrate processing apparatus 100 may use ink as the substrate processing liquid. The substrate processing liquid may be, for example, quantum dot (QD) ink containing ultrafine semiconductor particles. The substrate processing apparatus 100 may perform pixel printing on the substrate G using inks of various colors and may form color filters CF on the substrate G. Additionally, the substrate processing apparatus 100 may be provided as a recirculation system to prevent nozzle clogging caused by ink within the inkjet head unit 140.

The processing unit 110 supports the substrate G during the processing of the substrate G with the substrate processing liquid. The processing unit 110 may support the substrate G using a contact method or a non-contact method. When using the contact method, the processing unit 110 may adsorb the substrate G onto a chuck with a flat mounting surface on its top surface to support the substrate G. When using the non-contact method, the processing unit 110 may use air to suspend the substrate G in mid-air to support the substrate G.

While supporting the substrate G, the processing unit 110 may also move the substrate G from one direction to another direction. The processing unit 110 may be configured to include, for example, a first stage 111 and air holes 112.

The first stage 111, which serves as a base, may be provided to accommodate the substrate G thereon. The air holes 112 may be formed through upper and lower portions of the first stage 111. Multiple air holes 112 may be formed within a printing zone on the first stage 111.

The air holes 112 may eject air in an upward direction of the first stage 111, i.e., in a third direction 30. Through the air holes 112, the substrate G on the first stage 111 may be suspended in mid-air.

Although not illustrated in FIG. 1, the processing unit 110 may include a gripper and a guide rail. When the substrate G is moving along the length direction of the first stage 111, i.e., in a first direction 10, the gripper is used to grip the substrate G to prevent the substrate G from being detached from the first stage 111. When the substrate G is moving, the gripper may move in the same direction as the substrate G along the guide rail. The gripper and the guide rail may be provided on the outer side of the first stage 111.

The maintenance unit 120 performs maintenance on the substrate G. For example, the maintenance unit 120 may measure whether the substrate processing liquid is ejected onto the substrate G in droplet form, as well as the ejection point (or position), volume, range (or area), and speed of droplets of the substrate processing liquid. The maintenance unit 120 may provide such measurement results to a control unit, which will be described later.

For droplet inspection, the maintenance unit 120 may include a second stage 121, a measuring module 122, and a vision module 123. The second stage 121, which serves as a base, like the first stage 111, may be arranged parallel to the first stage 111. The second stage 121 may have a maintenance zone on its top surface and may be of the same size as or a different size from the first stage 111.

The measuring module 122 and the vision module 123 may directly inspect droplets. As will be described later, a droplet inspection unit may be configured to include the vision module 123. Alternatively, the droplet inspection unit may be configured to include the measuring module 122 and the vision module 123.

The measuring module 122 may include a substrate F onto which the substrate processing liquid is ejected. The substrate F may be used for droplet inspection purposes and may be in the form of a film. The measuring module 122 may be provided as, for example, a jetting-on-film (JOF) module. The measuring module 122 may also include a calibration board, which includes alignment marks, a ruler, and the like for droplet ejection point measurements.

The vision module 123 acquires images related to droplets when the substrate processing liquid is ejected onto the substrate F. To this end, the vision module 123 may include one or more cameras and may be provided as, for example, as a nozzle jetting inspection (NJI) module.

Specifically, the vision module 123 may acquire images related to droplets in real time when the substrate processing liquid is ejected onto the substrate F. For inspection purposes, the vision module 123 may capture images of the substrate F along the length direction of the first stage 111 (or the first direction 10). In this case, the vision module 123 may include a line scan camera. Alternatively, the vision module 123 may capture images by shooting the substrate F in units of particular-sized areas, in which case, the vision module 123 may include an area scan camera.

The vision module 123 may acquire images of the substrate F on the maintenance unit 120, but the present disclosure is not limited thereto. Alternatively, the vision module 123 may acquire images of the substrate F on the processing unit 110 when the substrate F is being processed for product manufacturing purposes. To this end, the vision module 123 may be installed on the bottom surface or side surface of the gantry unit 130, but the present disclosure is not limited thereto. The vision module 123 may also be installed on the front or side surface of the inkjet head unit 140, or may also be installed movably, but not fixed, on the gantry unit 130 or the inkjet head unit 140.

Although not illustrated in FIG. 1, the maintenance unit 120 may include a guide rail that guides the movement path of the measuring module 122. The guide rail may be provided to guide the measuring module 122 along the length direction of the second stage 121 (or the first direction 10) or the width direction of the second stage 121 (or a second direction 20). For instance, the guide rail may be provided as, for example, a linear motion (LM) guide system.

The gantry unit 130 supports the inkjet head unit 140. The gantry unit 130 may be positioned on top of the first and second stages 111 and 121 to enable the inkjet head unit 140 to eject the substrate processing liquid onto the substrates G and F.

The gantry unit 130 may be disposed to have its length direction aligned with the width direction of the first and second stages 111 and 121 (or the second direction 20). The gantry unit 130 may move in the length direction of the first and second stages 111 and 121 (or the first direction 10), following the guidance of first and second guide rails **160*a* and 160*b*. The first and second guide rails 160*a* and 160*b* may be provided on the outer sides of the first and second stages 111 and 121, respectively, along the length direction of the first and second stages 111 and 121. The first and second guide rails 160*a* and 160*b*** may be provided as, for example, LM guide systems.

Although not illustrated in FIG. 1, the substrate processing apparatus 100 may further include a gantry movement unit. The gantry movement unit controls the gantry unit 130 to move slidably along the first and second guide rails **160*a* and 160*b*. The gantry movement unit may include a motor and may be installed within the gantry unit 130. Alternatively, the gantry movement unit may be installed outside the gantry unit 130**.

The inkjet head unit 140 ejects the substrate processing liquid onto the substrate G as droplets. The inkjet head unit 140 may be installed on the side or bottom surface of the gantry unit 130.

At least one inkjet head unit 140 may be installed on the gantry unit 130. If multiple inkjet head units 140 are installed on the gantry unit 130, they may be arranged in a row along the length direction of the gantry unit 130 (or the second direction 20). Additionally, the multiple inkjet head units 140 may operate independently or synchronously.

To position itself at each desired location on the substrate G, the inkjet head unit 140 may move along the length direction of the gantry unit 130 (or the second direction 20). Moreover, the inkjet head unit 140 may move along the height direction of the gantry unit 130 (or the third direction 30) and may even rotate clockwise or counterclockwise. Conversely, the inkjet head unit 140 may also be fixed to the gantry unit 130, in which case the gantry unit 130 may be provided with the capability to move on the substrate G.

Although not illustrated in FIG. 1, the substrate processing apparatus 100 may further include an inkjet head movement unit. The inkjet head movement unit may enable the rectilinear movement or rotation of the inkjet head unit 140.

The substrate processing liquid supply unit 150 may be provided as a reservoir that provides the substrate processing liquid to the inkjet head unit 140. The substrate processing liquid supply unit 150 may be installed on the gantry unit 130 and may include a storage tank 151 and a pressure control module 152.

The storage tank 151 stores the substrate processing liquid, and the pressure control module 152 controls the internal pressure of the storage tank 151. Based on the pressure provided by the pressure control module 152, the storage tank 151 may supply the inkjet head unit 140 with an appropriate amount of substrate processing liquid.

The substrate processing liquid supply unit 150 may be integrated into a single module with the inkjet head unit 140. For example, the inkjet head unit 140 and the substrate processing liquid supply unit 150 may be positioned at the front of the gantry unit 130, and the substrate processing liquid supply unit 150 may be placed at a higher level than the inkjet head unit 140. However, the present disclosure is not limited to this example. Alternatively, the substrate processing liquid supply unit 150 may be configured as a separate module from the inkjet head unit 140. For instance, the inkjet head unit 140 and the substrate processing liquid supply unit 150 may be positioned separately at the front and rear of the gantry unit 130.

The substrate processing apparatus 100 may be provided as a piezoelectric inkjet printing system. In this case, the substrate processing apparatus 100 may use the voltage applied to piezoelectric elements to cause the substrate processing liquid to fall down on the substrate G as droplets through the nozzles of the inkjet head unit 140.

The substrate processing apparatus 100 may also be implemented as an electro-hydro-dynamic (EHD) inkjet printing system. In this case, when the substrate processing liquid exposed to a strong local electric field, an electrostatic force may be applied to the substrate processing liquid so that the substrate processing liquid may become charged, and the substrate processing apparatus 100 may eject the substrate processing liquid onto the substrate Gin accordance with the electrostatic attraction resulting from the charges injected into the substrate processing liquid. That is, the substrate processing apparatus 100 may provide the substrate processing liquid in a Taylor cone shape based on the difference in voltage (e.g., pulse direct current (DC) voltage) between the inkjet head unit 140 and the substrate G, and the substrate processing liquid may be ejected onto the substrate G, forming a printed line from the nozzles to the substrate G.

If the substrate processing apparatus 100 is implemented as a piezoelectric inkjet printing system, the inkjet head unit 140 may include piezoelectric elements, a nozzle plate, and multiple nozzles. The nozzle plate constitutes the body of the inkjet head unit 140. The multiple nozzles may be arranged in a multiple rows and columns with predetermined spacing from the nozzle plate. The piezoelectric elements may be embedded within the nozzle plate, and the number of piezoelectric elements may correspond to the number of nozzles. In this case, the inkjet head unit 140 may eject the substrate processing liquid onto the substrate G through the nozzles in accordance with the operation of the piezoelectric elements.

Meanwhile, the inkjet head unit 140 may independently control the ejection volume of the substrate processing liquid through each of the nozzles, according to the voltage applied to the piezoelectric elements.

Figure 2:
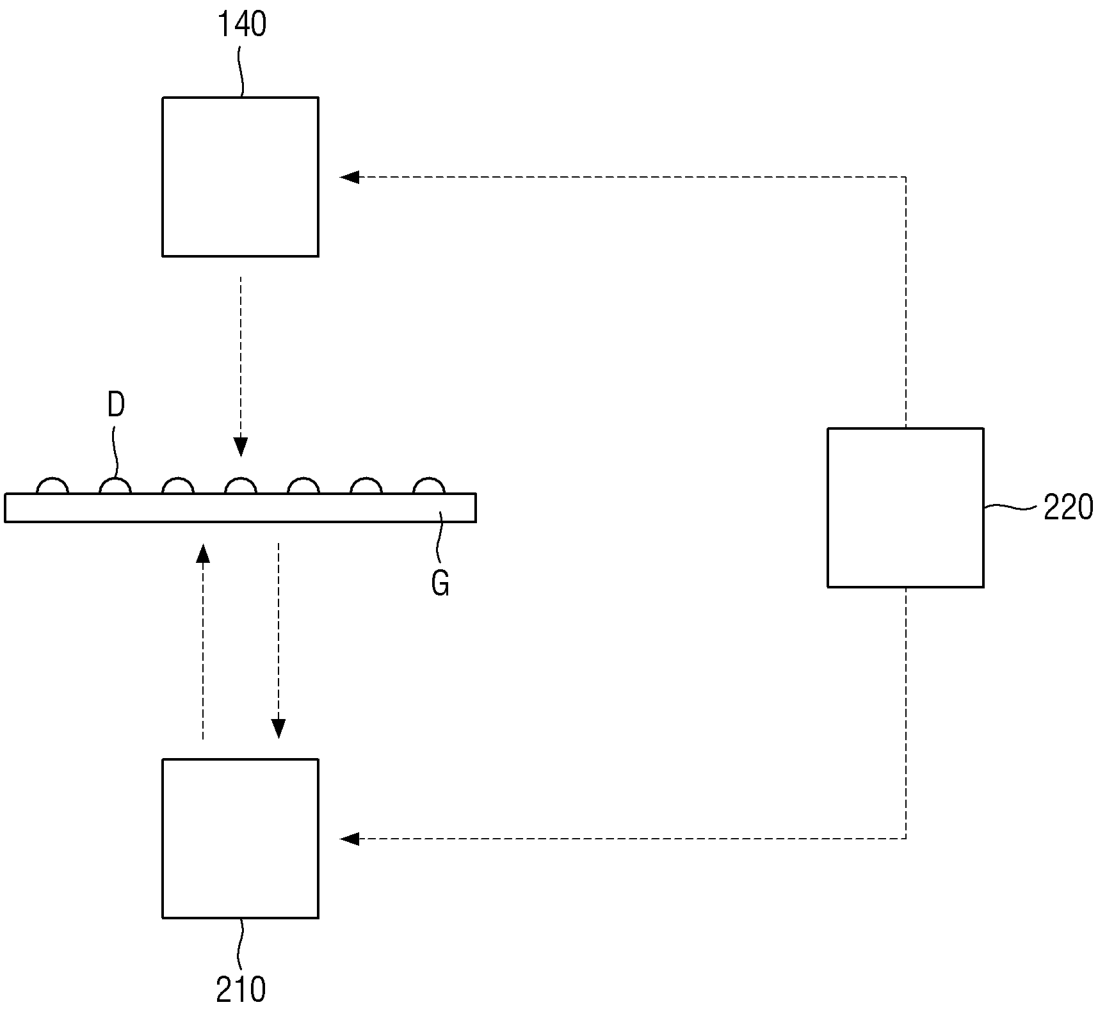
FIG. 2 is a block diagram illustrating the internal configuration of the substrate processing apparatus.

FIG. 2 is a block diagram illustrating the internal configuration of the substrate processing apparatus 100.

The inkjet head unit 140 has already been described above with reference to FIG. 1, and thus, a detailed description thereof will be omitted.

Referring to FIG. 2, a droplet inspection unit 210 inspects droplets ejected onto the substrate G. As previously described, the droplet inspection unit 210 may include the vision module 123 of FIG. 1, but the present disclosure is not limited thereto. The droplet inspection unit 210 may include both the vision module 123 and the measuring module 122, and this will be described later in further detail.

A control unit 220 generally controls the operations of the components of the substrate processing apparatus 100. The control unit 220 may control the operations of, for example, the inkjet head unit 140 and the droplet inspection unit 210. The control unit 220 may also control the operations of the processing unit 110, the maintenance unit 120, the gantry unit 130, and the substrate processing liquid supply unit 150.

The control unit 220 may include a process controller, which consists of a microprocessor (or a computer) that executes control of the substrate processing apparatus 100, a user interface, which includes a keyboard for an operator to input commands and manage the substrate processing apparatus 100 and a display to visualize and display the operational status of the substrate processing apparatus 100, and a memory unit, which stores control programs for executing processes under the control of the process controller or programs (or processing recipes) for executing processes in the substrate processing apparatus 100 based on various data and processing conditions. The user interface and the memory unit may be connected to the process controller. The processing recipes may be stored on a storage medium within the memory unit, such as a hard disk, a compact disc read-only memory (CD-ROM), a digital versatile disc (DVD), or a flash memory.

The control unit 220 also performs maintenance for the inkjet head unit 140. For example, the control unit 220 may adjust the substrate processing liquid ejection points of the individual nozzles equipped in the inkjet head unit 140 based on droplet measurement data from the droplet inspection unit 210, or may detect any defective nozzles (i.e., nozzles not ejecting the substrate processing liquid) among the multiple nozzles of the inkjet head unit 140 and initiate a cleaning operation for the defective nozzles.

A conventional substrate processing apparatus may not be able to inspect droplets ejected by an inkjet head unit during the processing of the substrate G, and can perform droplet inspection with a separate unit, only after the processing of the substrate G is complete. Accordingly, any jetting abnormalities in the inkjet head unit cannot be properly identified during the processing of the substrate G, leading to failure to readily take appropriate actions (such as print compensation).

On the contrary, to address such issues, the substrate processing apparatus 100 is characterized by being able to inspect droplets D ejected by the inkjet head unit 140 even when the substrate G is being processed. Accordingly, the substrate processing apparatus 100 can promptly respond in real time to and take mitigation measures for any jetting abnormalities in the inkjet head unit 140.

Figure 3:
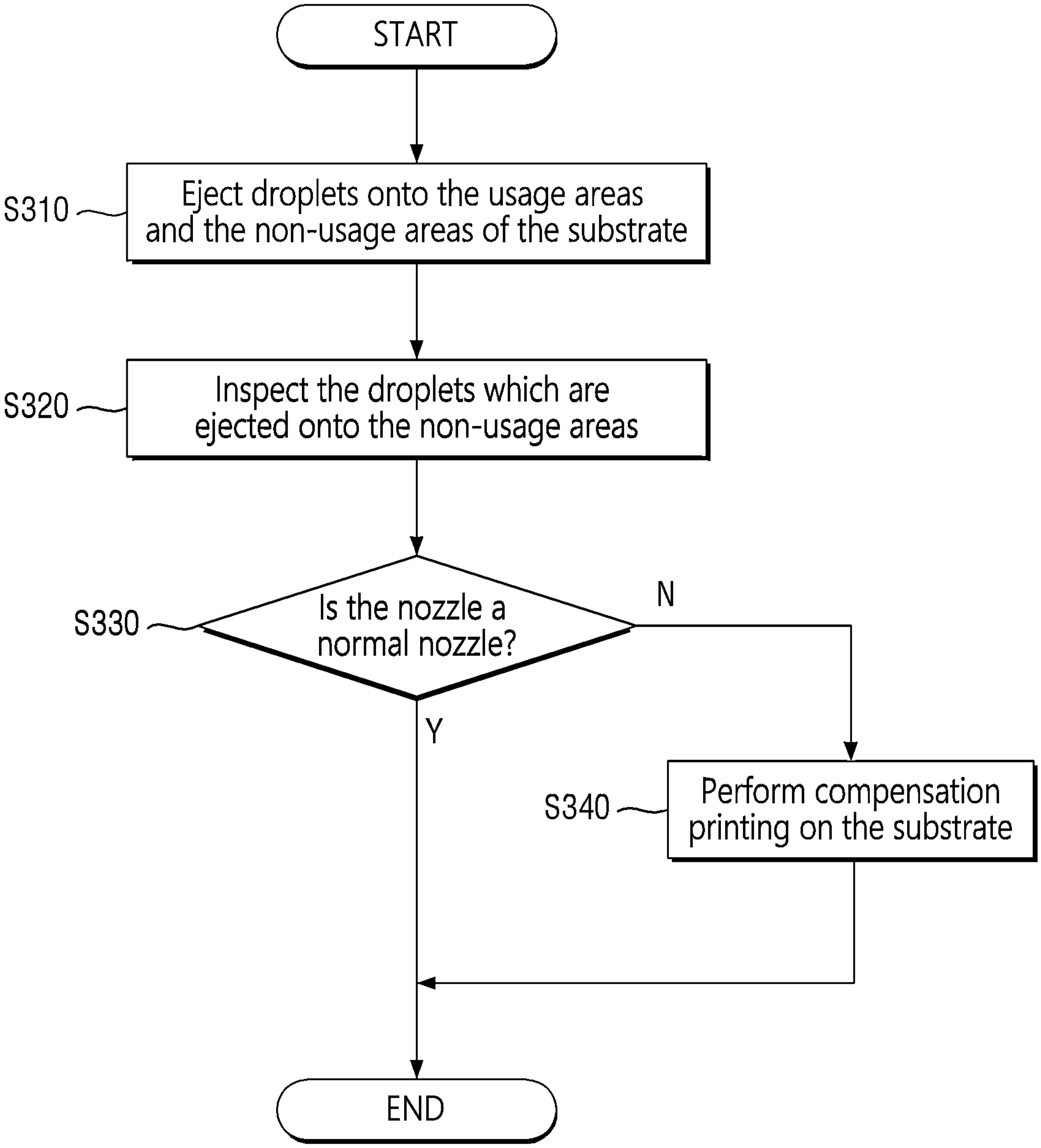
FIG. 3 is a flowchart illustrating a droplet inspection method of a droplet inspection unit and a control unit of the substrate processing apparatus.

FIG. 3 is a flowchart illustrating a droplet inspection method of the droplet inspection unit 210 and the control unit 220 of the substrate processing apparatus 100.

Referring to FIGS. 1 through 3, when droplets D are ejected onto the substrate G by the inkjet head unit 140, the droplet inspection unit 210 inspects the droplets (D) (S310 and S320).

As mentioned earlier, the inspection of the droplets D may be performed simultaneously with the processing of the substrate G. For this purpose, the inkjet head unit 140 may eject the substrate processing liquid in droplet form not only onto a printing area, but also onto a non-printing area of the substrate G.

The substrate G is moved from one direction to another direction by the processing unit 110. In this process, the substrate G may be subjected to printing by the inkjet head unit 140. However, not all parts on the substrate G undergo pixel printing, and the substrate G may be divided into an area that is subject to printing and an area that is not subjected to printing.

Figure 4:
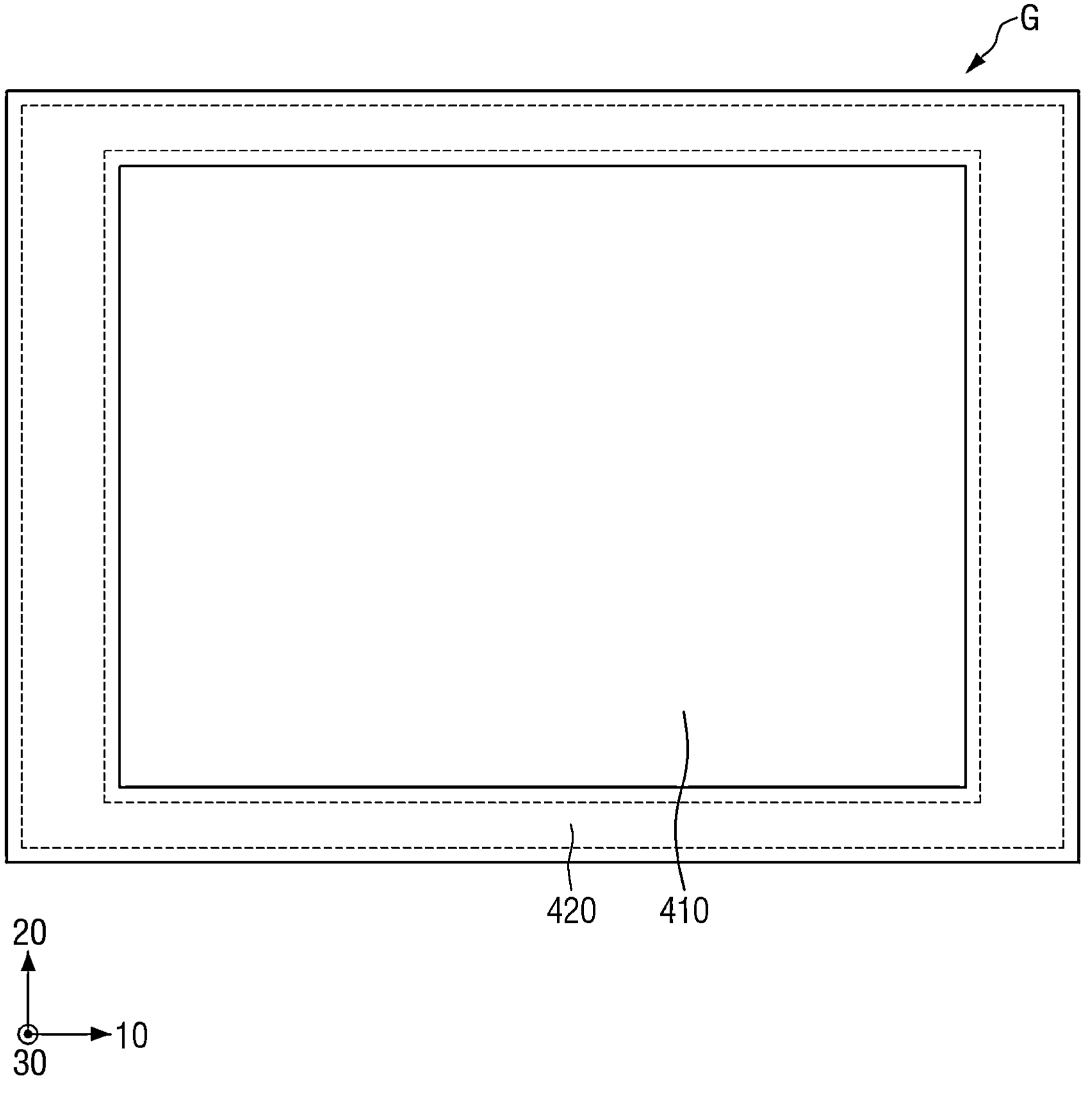
FIG. 4 is a first exemplary schematic view illustrating usage areas and non-usage areas that can be provided on a substrate.

FIG. 4 is a first exemplary schematic view illustrating usage areas and non-usage areas that can be provided on the substrate G.

Referring to FIG. 4, the top surface of the substrate G may be divided into a printing processing area 410 that is processed through pixel printing and a non-printing processing area 420 that is not processed. The printing processing area 410 will hereinafter be referred to as the usage area 410, and the non-printing processing area 420 will hereinafter be referred to as the non-usage area 420.

Typically, the substrate G includes both the usage area 410 and the non-usage area 420. The usage area 410 is the area where glass is used during printing, and during the processing of the substrate G, the substrate processing liquid is ejected onto the usage area 410 by the inkjet head unit 140. On the other hand, the non-usage area 420 is the area where glass is not used during printing, and during the processing of the substrate G, no substrate processing liquid is ejected onto the non-usage area 420.

When the substrate G includes both the usage area 410 and the non-usage area 420, the non-usage area 420 may be positioned on the outer side of the substrate G compared to the usage area 410. For example, the usage area 410 may be positioned in the central part of the substrate G, while the non-usage area 420 may be positioned along the edges of the substrate G.

Figure 5:
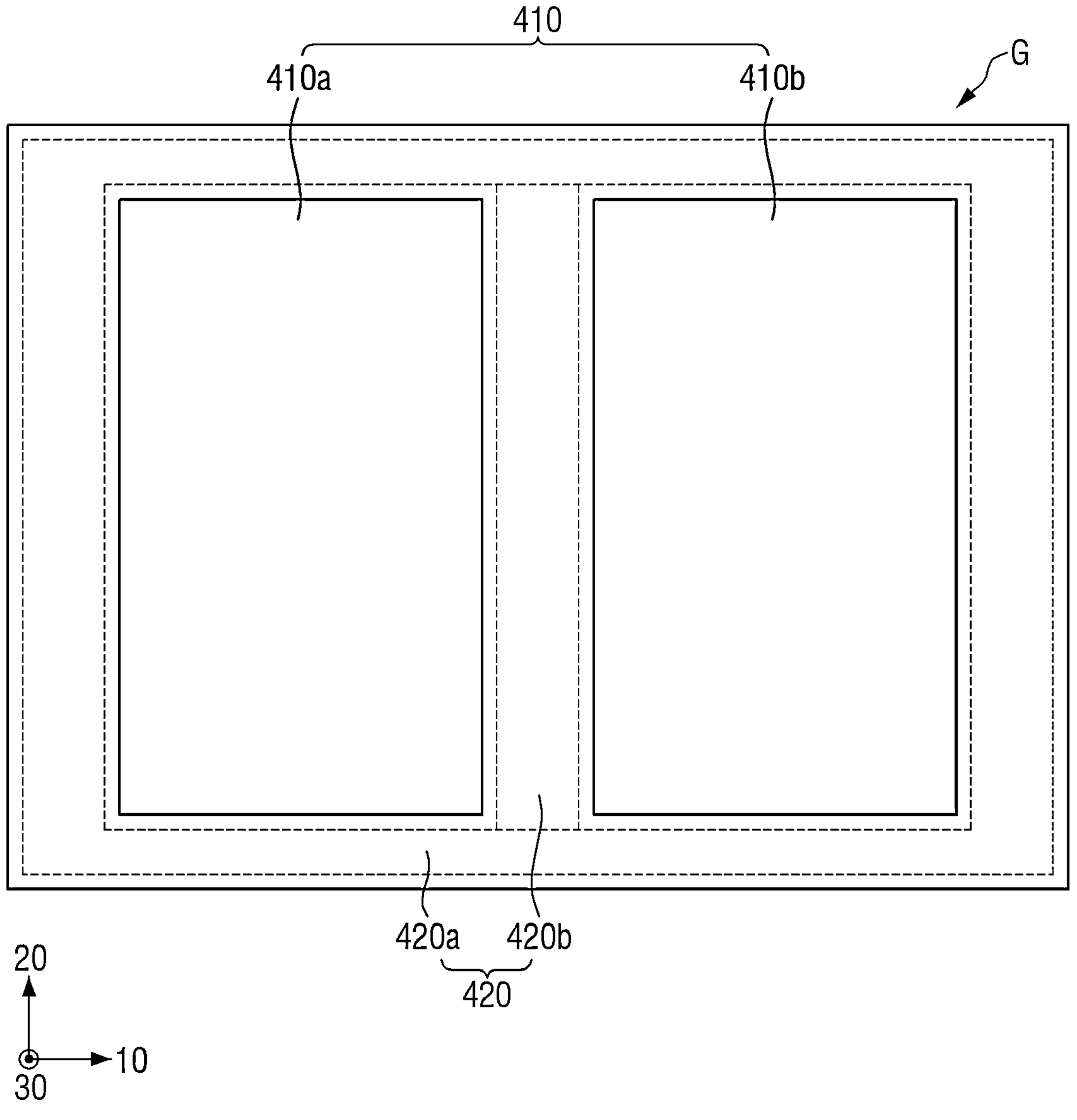
FIG. 5 is a second exemplary schematic view illustrating usage areas and non-usage areas that can be provided a substrate.

In the example of FIG. 4, the substrate G includes a single usage area 410, but the present disclosure is not limited thereto. Alternatively, the substrate G my include multiple usage areas 410. For example, as illustrated in FIG. 5, the substrate G may include two usage areas 410, i.e., first and second usage areas 410*a* and 410*b*. In this case, a non-usage area (420*a* and 420*b*) may be positioned on the outer side of the substrate G compared to the first and second usage areas 410*a* and 410*b*, and may even be disposed between the first and second usage areas 410*a* and 410*b*. The non-usage area (420*a* and 420*b*) includes a first non-usage area 420*a*, which is part of the non-usage area (420*a* and 420*b*) positioned closer to the edges of the substrate G compared to the first and second usage areas 410*a* and 410*b*, and a second non-usage area 420*b*, which is part of the non-usage area (420*a* and 420*b*) between the first and second usage areas 410*a* and 410*b*. FIG. 5 is a second exemplary schematic view illustrating usage areas and non-usage areas that can be provided on the substrate G.

Referring back to FIG. 3, the inkjet head unit 140 may eject the substrate processing liquid as droplets D onto the usage area 410 and the non-usage area 420 of the substrate G (S310). Thereafter, the droplet inspection unit 210 may inspect the droplets D ejected onto the non-usage area 420 (S320). The droplets D ejected onto the usage area 410 may be utilized for processing the substrate G, while the droplets D ejected onto the non-usage area 420 may be used for inspecting the nozzles within the inkjet head unit 140.

As mentioned earlier, the droplet inspection unit 210 may include the vision module 123, which includes at least one camera. In this case, the droplet inspection unit 210 captures an image of the non-usage area 420 of the substrate G where droplets D have been ejected and provides the captured image to the control unit 220.

Figure 6:
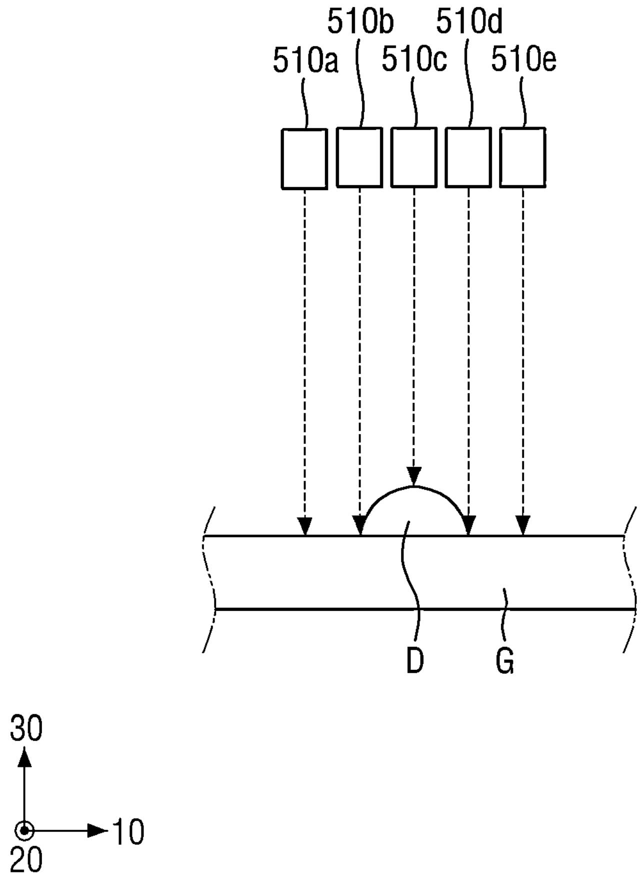
FIG. 6 is a first exemplary schematic view illustrating the performance of the droplet inspection unit of the substrate processing apparatus.

However, the present disclosure is not limited to this. The droplet inspection unit 210 may include multiple distance measurement sensors and provide measurement results obtained from the distance measurement sensors to the control unit 220. For example, referring to FIG. 6, five distance measurement sensors, i.e., first, second, third, fourth, and fifth distance measurement sensors 510*a*, 510*b*, 510*c*, 510*d*, and 510*e*, may be arranged in the first direction 10 to obtain information regarding the height of the droplets D. In this example, the first, second, third, fourth, and fifth distance measurement sensors 510*a*, 510*b*, 510*c*, 510*d*, and 510*e* are arranged in rows and columns in both the first and second directions 10 and 20. With the first, second, third, fourth, and fifth distance measurement sensors 510*a*, 510*b*, 510*c*, 510*d*, and 510*e*, information not only regarding the height of the droplets D but also regarding the area, volume, and ejection status of the droplets D may be obtained. FIG. 6 is a first exemplary schematic view illustrating the performance of the droplet inspection unit 210 of the substrate processing apparatus 100.

Meanwhile, assuming that the first, second, third, fourth, and fifth distance measurement sensors 510*a*, 510*b*, 510*c*, 510*d*, and 510*e* output optical signals vertically, information regarding the ejection point of the droplets D may be obtained based on position information of the first, second, third, fourth, and fifth distance measurement sensors 510*a*, 510*b*, 510*c*, 510*d*, and 510*e*. Alternatively, one of the cameras of the vision module 123 may be positioned to capture in either the first or second direction 10 or 20 to obtain information regarding the velocity of the droplets D. The distance measurement sensors of the droplet inspection unit 210 may include ultrasound sensors, infrared sensors, or laser sensors or may include a combination of two or more types of sensors from among ultrasound sensors, infrared sensors, and laser sensors.

Figure 7:
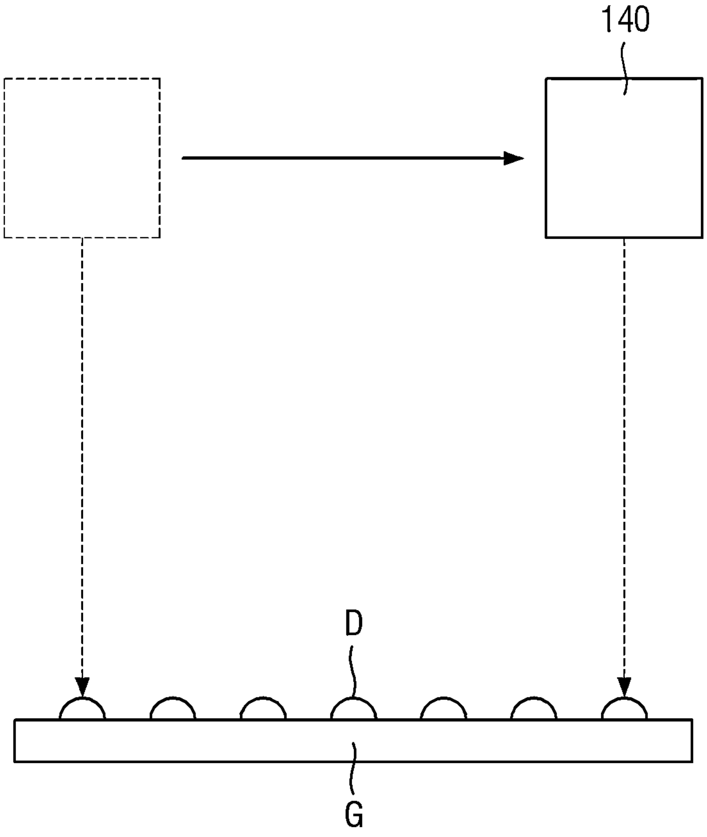
FIG. 7 is a second exemplary schematic view illustrating the performance of a droplet inspection unit of the substrate processing apparatus.

The droplet inspection unit 210 may inspect the droplets D ejected onto the non-usage area 420 in units of swaths. Here, a swath refers to one round of pixel printing performed by the inkjet head unit 140 moving forward or backward from one end to the other end of the substrate G with the substrate G fixed at a particular position. The droplet inspection unit 210 may inspect the droplets D ejected onto the non-usage area 420 at the completion of each swath. Whenever the inkjet head unit 140 completes one round of pixel printing for the entire substrate G while moving from one end to the other end of the substrate G, the droplet inspection unit 210 may inspect the droplets D ejected onto the non-usage area 420. FIG. 7 is a second exemplary schematic view illustrating the performance of the droplet inspection unit 210 of the substrate processing apparatus 100.

Figure 8:
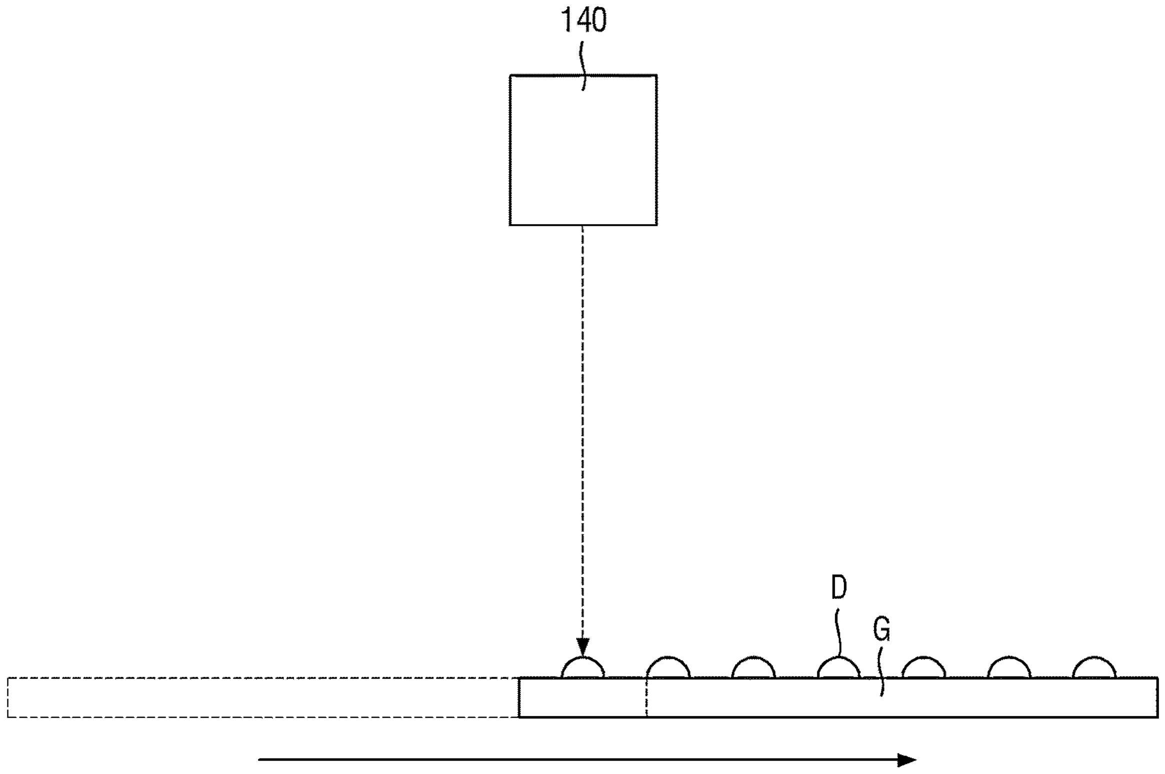
FIG. 8 is a third exemplary schematic view illustrating the performance of a droplet inspection unit of the substrate processing apparatus.

Referring to FIG. 8, a swath may also refer to one round of pixel printing performed from one end to the other end of the substrate G by the inkjet head unit 140 while moving the substrate G forward or backward along the length direction of the first stage 111 (or the first direction 10). The droplet inspection unit 210 may inspect the droplets D ejected onto the non-usage area 420 at the completion of each swath. Whenever the inkjet head unit 140 completes one round of pixel printing for the entire substrate G while sequentially ejecting the droplets D from one end to the other end of the substrate G, the droplet inspection unit 210 may inspect the droplets D ejected onto the non-usage area 420. FIG. 8 is a third exemplary schematic view illustrating the performance of the droplet inspection unit 210 of the substrate processing apparatus 100.

The droplet inspection unit 210 may inspect the droplets D ejected onto the non-usage area 420 at the completion of each swath (i.e., after each swath), but the present disclosure is not limited thereto. Alternatively, the droplet inspection unit 210 may inspect the droplets D ejected onto the non-usage area 420 at the completion of multiple swaths. For example, the droplet inspection unit 210 may inspect the droplets D ejected onto the non-usage area 420 after every two swaths. The inkjet head unit 140 may perform pixel printing while moving forward from one end to the other end of the substrate G. Subsequently, the inkjet head unit 140 may also perform pixel printing while moving backward from the other end to the one end of the substrate G. In other words, the inkjet head unit 140 may perform pixel printing through reciprocating movement between the one end and the other end of the substrate G. Once a full cycle of the reciprocating movement of the inkjet head unit 140 is completed, the droplet inspection unit 210 may inspect the droplets D ejected onto the non-usage area 420.

Moreover, the droplet inspection unit 210 may inspect droplets D whenever they are ejected onto the non-usage area 420, ensuring real-time inspection during pixel printing.

The droplet inspection unit 210 may perform droplet inspection for all the nozzles within the inkjet head unit 140, but the present disclosure is not limited thereto. Alternatively, the droplet inspection unit 210 may perform droplet inspection selectively on the nozzles used in pixel printing for the substrate G.

Referring back to FIG. 3, upon the inspection of droplets D by the droplet inspection unit 210, the results of the inspection may be provided to the control unit 220. The control unit 220 determines whether the nozzles within the inkjet head unit 140 that have ejected the droplets D are defective nozzles based on the inspection results from the droplet inspection unit 210 (S330).

For example, in the case of detecting defective nozzles based on the ejection status of the droplets D, the control unit 220 may determine nozzles from which the droplets D have been ejected onto the substrate G as normal nozzles and nozzles from which the droplets D have not been ejected as defective nozzles.

In another example, in the case of detecting defective nozzles based on the height/area/volume (or ejection quantity) of the droplets D, the control unit 220 may compare the height/area/volume of the droplets D with a predefined range. If the height/area/volume of the droplets D falls within the predefined range, the control unit 220 may determine the nozzles as normal. Conversely, if the height/area/volume of the droplet D exceeds the predefined range, the control unit 220 may determine the nozzles as defective.

In another example, in the case of detecting defective nozzles based on the ejection point (or target point) of the droplets D, the control unit 220 may compare the ejection point of the droplets D with a reference position. If the ejection point of the droplets D matches the reference position, the control unit 220 may determine the nozzles as normal. Conversely, if the ejection point of the droplets D does not match the reference position, the control unit 220 may determine the nozzles as defective.

If the nozzles within the inkjet head unit 140 are determined as defective based on the results of the determination performed in S330, the control unit 220 controls the inkjet head unit 140 to perform compensation printing on the substrate G (S340).

Here, compensation printing refers to performing re-printing on portions of the substrate G where the droplets D have not been ejected. Nozzles classified as defective are either nozzles that have not ejected droplets D or have ejected droplets D imperfectly. By inspecting the droplets D on the substrate G in real time and performing compensation printing when issues arise, wastage of the substrate G and substrate processing liquid can be prevented, and processing time (or takt time) can be reduced, leading to an increased processing efficiency.

When performing compensation printing, replacement nozzles may be used instead of defective nozzles. In this case, the control unit 220 may perform compensation printing on the substrate G as follows.

Figure 9:
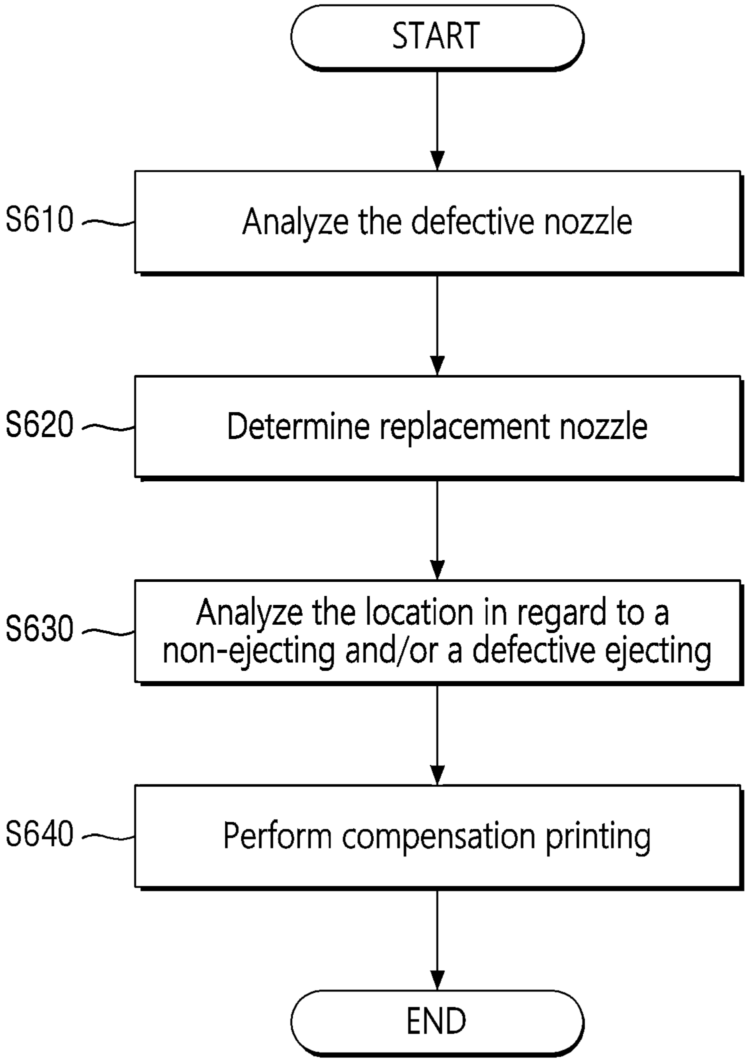
FIG. 9 is a flowchart illustrating a compensation printing method of a control unit of the substrate processing apparatus.

FIG. 9 is a flowchart illustrating a compensation printing method of the control unit 220 of the substrate processing apparatus 100.

Referring to FIG. 9, the control unit 220 analyzes the type of defective nozzles (S610). Through this analysis, the control unit 220 may determine, for example, which color of ink the defective nozzles are ejecting.

Thereafter, the control unit 220 determines replacement nozzles to replace the defective nozzles (S620). The control unit 220 may select the replacement nozzles from among the multiple nozzles within the inkjet head unit 140 based on the results of the analysis of the defective nozzles. For example, if the control unit 220 identifies the color of ink being ejected by the defective nozzles, the control unit 220 may select nozzles that eject the same color of ink as the detected nozzles as the replacement nozzles.

Thereafter, the control unit 220 analyzes and identifies the locations on the substrate G where droplets D have not been ejected due to nozzle defects (S630). When performing pixel printing on the substrate G, the points on the substrate G where the nozzles within the inkjet head unit 140 need to eject ink may be determined in advance. Therefore, once the type of the defective nozzles is identified, the locations where droplets D have not been ejected may be identified.

Thereafter, the control unit 220 controls the replacement nozzles within the inkjet head unit 140 to eject droplets D onto the points on the substrate G where droplets D have not been ejected (S640). Through this type of interaction between the control unit 220 and the inkjet head unit 140, compensation printing using replacement nozzles may be performed.

The control unit 220 may analyze, in step S630, the points on the substrate G where droplets D have been defectively ejected and eject droplets D, in step S640, onto the defectively ejected points on the substrate G using replacement nozzles.

If the defective nozzles are identified, the control unit 220 may perform compensation printing for the entire substrate G. In this case, the control unit 220 may exclude the defective nozzles and perform compensation printing using nozzles adjacent to the defective nozzles.

The droplet inspection unit 210 and the control unit 220 may perform compensation printing through droplet inspection after partial processing of the substrate G. Generally, multiple swaths may be taken until the substrate G is completely processed. Thus, performing droplet inspection and compensation printing at the completion of one or two swaths may be understood as performing droplet inspection and compensation printing after partial processing of the substrate G.

Alternatively, the droplet inspection unit 210 and the control unit 220 may perform droplet inspection and compensation printing after pixel printing on some of the areas on the substrate G. For example, after conducting pixel printing on the first usage area 410*a* of FIG. 5, the droplet inspection unit 210 and the control unit 220 may perform droplet inspection and compensation printing before conducting pixel printing on the second usage area 410*b*.

The droplet inspection unit 210 and the control unit 220 may perform droplet inspection and compensation printing in real time.

The substrate processing apparatus 100 may generate images to be used for processing a substrate S and perform pixel printing based on the generated images. To complete the processing of the substrate S, multiple images are required. However, if pixel printing is conducted only after the generation of all the multiple images, the processing of the substrate S may be considerably delayed.

To address this issue, some images may be generated first, and pixel printing may be performed based on the generated images. Then, other images may be generated, and pixel printing may be performed based on the other images. In this case, however, pixel printing needs to be paused during the generation of images, which may lead to various problems within the substrate processing apparatus 100, such as coagulation of the substrate processing liquid.

In the present embodiment, some images may be generated first, and other images may be generated. Then, during the generation of the other images, pixel printing, droplet inspection, and compensation printing may be performed based on the previously-generated images. As a result, images can be generated in real time, and the substrate processing apparatus 100 can become suitable for a streaming function. Here, the streaming function refers to the capability of generating images in real time. Furthermore, pixel printing, droplet inspection, and compensation printing can be consecutively conducted.

Meanwhile, the droplet inspection unit 210 and the control unit 220 may perform droplet inspection and compensation printing at an interval of, for example, a swath, and may reflect the results of the droplet inspection and the compensation printing into the generation of streaming images. Here, the streaming images refer to images used for processing the substrate S, mentioned earlier, and are associated with swaths.

The droplet inspection unit 210 and the control unit 220 may also utilize a film-type substrate F within the measurement module 122, instead of the non-usage area 420 of the substrate G, for droplet inspection. In the description that follows, the substrate G arranged on the substrate processing unit 110 is defined as a first substrate, and the substrate F arranged within the measurement module 122 of the maintenance unit 120 is defined as a second substrate.

Figure 10:
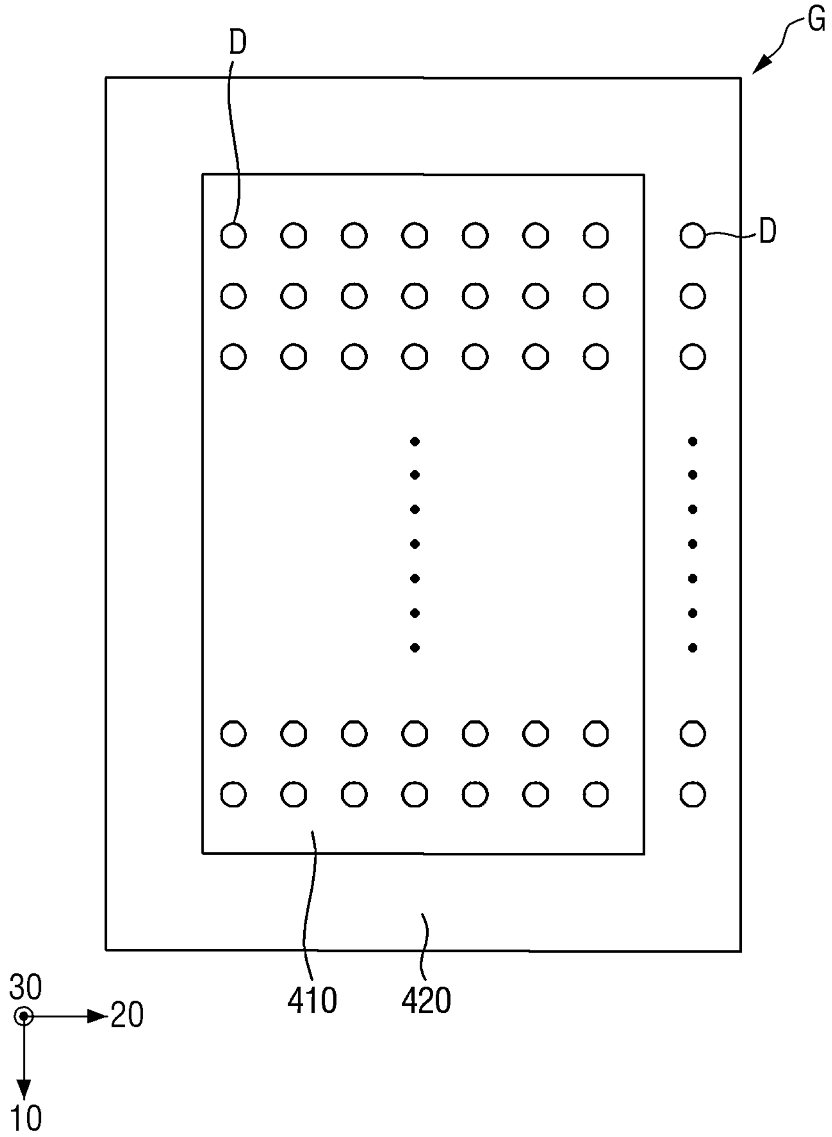
FIG. 10 is a first exemplary schematic view illustrating the use of a second substrate alongside a non-usage area of a first substrate.

Referring to FIG. 10, when using the non-usage area 420 of the first substrate G for droplet inspection and compensation printing, the inkjet head unit 140 ejects droplets D onto both the usage area 410 and the non-usage area 420 of the first substrate G, and the droplet inspection unit 210 and the control unit 220 conduct droplet inspection and compensation printing based on the droplets D ejected onto the non-usage area 420 of the first substrate G. FIG. 10 is a first exemplary schematic view illustrating the use of the second substrate F alongside the non-usage area 420 of the first substrate G.

However, the present disclosure is not limited to this. Alternatively, as mentioned earlier, the second substrate F within the measurement module 122 may be used instead of the non-usage area 420 of the first substrate G. The first substrate G may be positioned in a printing zone 430 on the first stage 111, and the measurement module 122 and the second substrate F may be positioned in a maintenance area 440 on the second stage 121.

Figure 11:
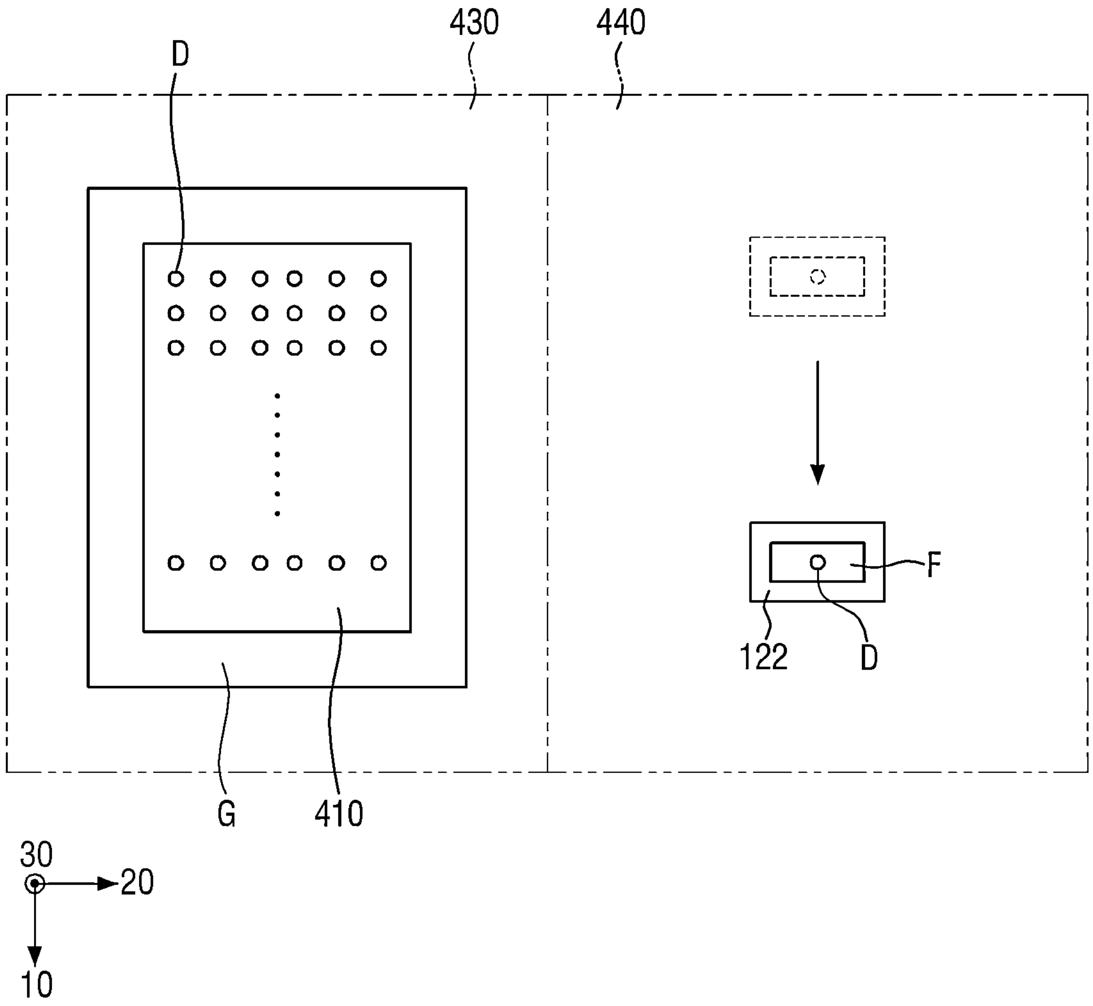
FIG. 11 is a second exemplary schematic view illustrating the use of the second substrate alongside the non-usage area of the first substrate.

In other words, referring to FIG. 11, when the inkjet head unit 140 ejects droplets D onto a particular area of the first substrate G, the measurement module 122 may be placed on the same line as the second substrate F, allowing the inkjet head unit 140 to eject droplets D onto the second substrate F instead of onto the non-usage area 420 of the first substrate G. In this case, the droplet inspection unit 210 and the control unit 220 may perform droplet inspection and compensation printing based on the droplets D ejected onto the second substrate F. FIG. 11 is a second exemplary schematic view illustrating the use of the second substrate F alongside the non-usage area 420 of the first substrate G.

Figure 12:
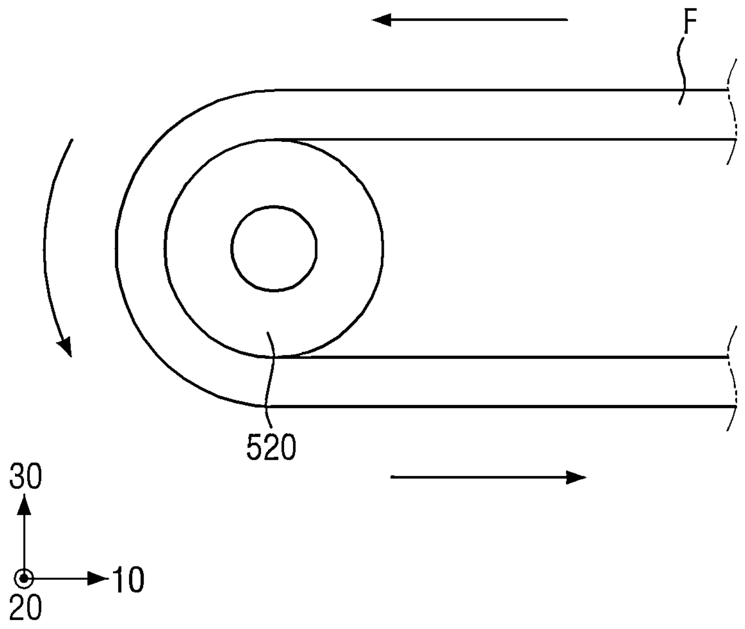
FIG. 12 is a third exemplary schematic view illustrating the use of the second substrate alongside the non-usage area of the first substrate.

Meanwhile, in order to eject droplets D in a row, as illustrated in FIG. 10, the measurement module 122 may use a roller 520, as shown in the example of FIG. 12, to rotate the second substrate G whenever droplets D are ejected by the inkjet head unit 140. FIG. 12 is a third exemplary schematic view illustrating the use of the second substrate alongside the non-usage area 420 of the first substrate G.

A droplet measurement method and a compensation printing method, particularly, a droplet measurement method and a compensation printing method that can be performed in real time during printing, have been described so far with reference to FIGS. 1 through 12.

According to embodiments of the present disclosure, a measurement can be performed between prints (e.g., at intervals of a swath or a predetermined number of swaths), and as a result, a compensation algorithm can be applied whenever problems arise. In other words, during printing, jetting and measurement can be performed on a particular area of a target object at intervals of a swath or a predetermined number of swaths, and compensation printing can be conducted based on data measured at intervals of a swath or a predetermined number of swaths. Additionally, any abnormalities such as ejection failures can be taken into account in the generation of subsequent pattern images. Here, compensation printing refers to performing re-printing using only defective nozzles or using replacement nozzles instead of the defective nozzles.

According to embodiments of the present disclosure, a "prejet" effect can be additionally achieved by jetting onto the area where is not used on the glass during printing. Furthermore, a time-saving effect can be achieved by eliminating the need for inspection with a separate unit. All nozzles or only nozzles used for printing may be used as jetting/measurement nozzles.

Performing measurement and compensation for each swath may take some time. However, as jetting/measurement with a separate unit can be omitted, time can be saved up. Moreover, when using a streaming function (or a real-time image generation function), any time delay can be prevented by performing measurement at regular intervals of time and reflecting the results of the measurement in the generation of streaming images. The streaming function refers to the function of generating images in real time, particularly, creating at least five images and then creating subsequent images in real time during printing.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A substrate processing apparatus comprising:

a first stage supporting a substrate;

an inkjet head unit ejecting a substrate processing liquid onto the substrate as droplets;

a gantry unit moving the inkjet head unit on the first stage;

a droplet inspection unit inspecting the droplets; and a control unit performing compensation on the substrate based on results of the inspection of the droplets, wherein the inkjet head unit ejects the substrate processing liquid onto a usage area and a non-usage area of the substrate, and the droplet inspection unit inspects the droplets ejected onto the non-usage area, the droplet inspection unit comprises multiple distance measurement sensors, the control unit is configured to determine whether one or more nozzles are defective among a plurality of nozzles using whether the droplets are ejected or not, a height of the droplets, an area of the droplets, a volume of the droplets, and an ejected position of the droplets based on measurement of the multiple distance measurement sensors, and the ejecting of the substrate processing liquid by the inkjet head unit and the inspecting of the droplets by the droplet inspection unit are performed simultaneously to respond to jetting abnormality caused by one or more defective nozzles.

2. The substrate processing apparatus of claim 1, wherein the droplet inspection unit inspects the droplets in units of swaths, and the swaths are associated with a number of times pixel printing has been performed on an entire surface of the substrate.

3. The substrate processing apparatus of claim 2, wherein each of the swaths corresponds to a forward or backward movement of the inkjet head unit and/or the substrate.

4. The substrate processing apparatus of claim 2, wherein the droplet inspection unit inspects the droplets at a completion of at least one swath.

5. The substrate processing apparatus of claim 1, wherein the non-usage area is positioned on an outer side of the substrate compared to the usage area.

6. The substrate processing apparatus of claim 1, wherein multiple usage areas are provided on the substrate.

7. The substrate processing apparatus of claim 6, wherein the non-usage area is positioned between two different usage areas.

8. The substrate processing apparatus of claim 1, wherein the droplet inspection unit inspects the droplets for nozzles that have been used to process the substrate, among the plurality of nozzles within the inkjet head unit.

9. The substrate processing apparatus of claim 1, wherein the droplet inspection unit inspects the droplet whenever the substrate is partially processed.

10. The substrate processing apparatus of claim 1, wherein the control unit performs compensation on the substrate depending on whether there are any defective nozzles among the plurality of nozzles used to process the substrate.

11. The substrate processing apparatus of claim 1, wherein the control unit performs compensation on the substrate by replacing defective nozzles with replacement nozzles.

12. The substrate processing apparatus of claim 11, wherein the control unit analyzes a type of the defective nozzles, determines normal nozzles to replace the defective nozzles based on results of the analysis, identifies points on the substrate where the normal nozzles are to eject the substrate processing liquid, and performs compensation on the substrate using the normal nozzles.

13. The substrate processing apparatus of claim 1, wherein the control unit applies results of the compensation performed on the substrate to generation of streaming images associated with the substrate where the droplets have been ejected.

14. A substrate processing apparatus comprising:

a first stage supporting a substrate;

an inkjet head unit ejecting a substrate processing liquid onto the substrate as droplets;

a gantry unit moving the inkjet head unit on the first stage;

a droplet inspection unit inspecting the droplets; and a control unit performing compensation on the substrate based on results of the inspection of the droplets, wherein the inkjet head unit ejects the substrate processing liquid onto a usage area and a non-usage area of the substrate, the droplet inspection unit inspects the droplets ejected onto the non-usage area, the droplet inspection unit inspects the droplets in units of swaths, the swaths are associated with a number of times pixel printing has been performed on an entire surface of the substrate, the droplet inspection unit inspects the droplets for nozzles that have been used to process the substrate, among a plurality of nozzles within the inkjet head unit, and the control unit performs compensation on the substrate by replacing defective nozzles with replacement nozzles, the droplet inspection unit comprises multiple distance measurement sensors, the control unit is configured to determine whether one or more nozzles are defective among a plurality of nozzles using whether the droplets are ejected or not, a height of the droplets, an area of the droplets, a volume of the droplets, and an ejected position of the droplets based on measurement of the multiple distance measurement sensors, and the ejecting of the substrate processing liquid by the inkjet head unit and the inspecting of the droplets by the droplet inspection unit are performed simultaneously to respond to jetting abnormality caused by the defective nozzles.

15. A substrate processing method comprising:

ejecting a substrate processing liquid onto a usage area and a non-usage area of a substrate;

inspecting droplets ejected onto the non-usage area; and performing compensation on the substrate based on results of the inspection of the droplets, wherein;

the performing compensation comprises performing compensation on the substrate depending on whether there are any defective nozzles among nozzles used to process the substrate, the substrate processing method further comprises determining whether one or more nozzles are defective among a plurality of nozzles using whether the droplets are ejected or not, a height of the droplets, an area of the droplets, a volume of the droplets, and an ejected position of the droplets based on measurement of multiple distance measurement sensors, and the ejecting of the substrate processing liquid and the inspecting of the droplets are performed simultaneously to respond to jetting abnormality caused by the any defective nozzles.

16. The substrate processing method of claim 15, wherein the performing compensation comprises analyzing defective nozzles, determining normal nozzles to replace the defective nozzles based on results of the analysis of the defective nozzles, identifying points on the substrate where the normal the normal nozzles are to eject the substrate processing liquid, and performs compensation on the substrate using the normal nozzles.

17. The substrate processing method of claim 15, wherein the inspecting the droplets comprises inspecting the droplets in units of swaths, and the swaths are associated with a number of times pixel printing has been performed on an entire surface of the substrate in accordance with a forward or backward movement of an inkjet head unit and/or the substrate.

18. The substrate processing method of claim 15, wherein the non-usage area is positioned on an outer side of the substrate compared to the usage area, or if multiple usage areas are provided, the non-usage area is positioned between two different usage areas.

19. The substrate processing method of claim 15, wherein the performing compensation comprises performing compensation by replacing defective nozzles with normal nozzles.

20. The substrate processing method of claim 15, further comprising:

applying results of the compensation performed on the substrate to generation of streaming images associated with the substrate where the droplets have been ejected.

* * * * *